Sept. 26, 1944.  H. E. BALSIGER  2,359,017
RELIEF VALVE
Filed March 4, 1942
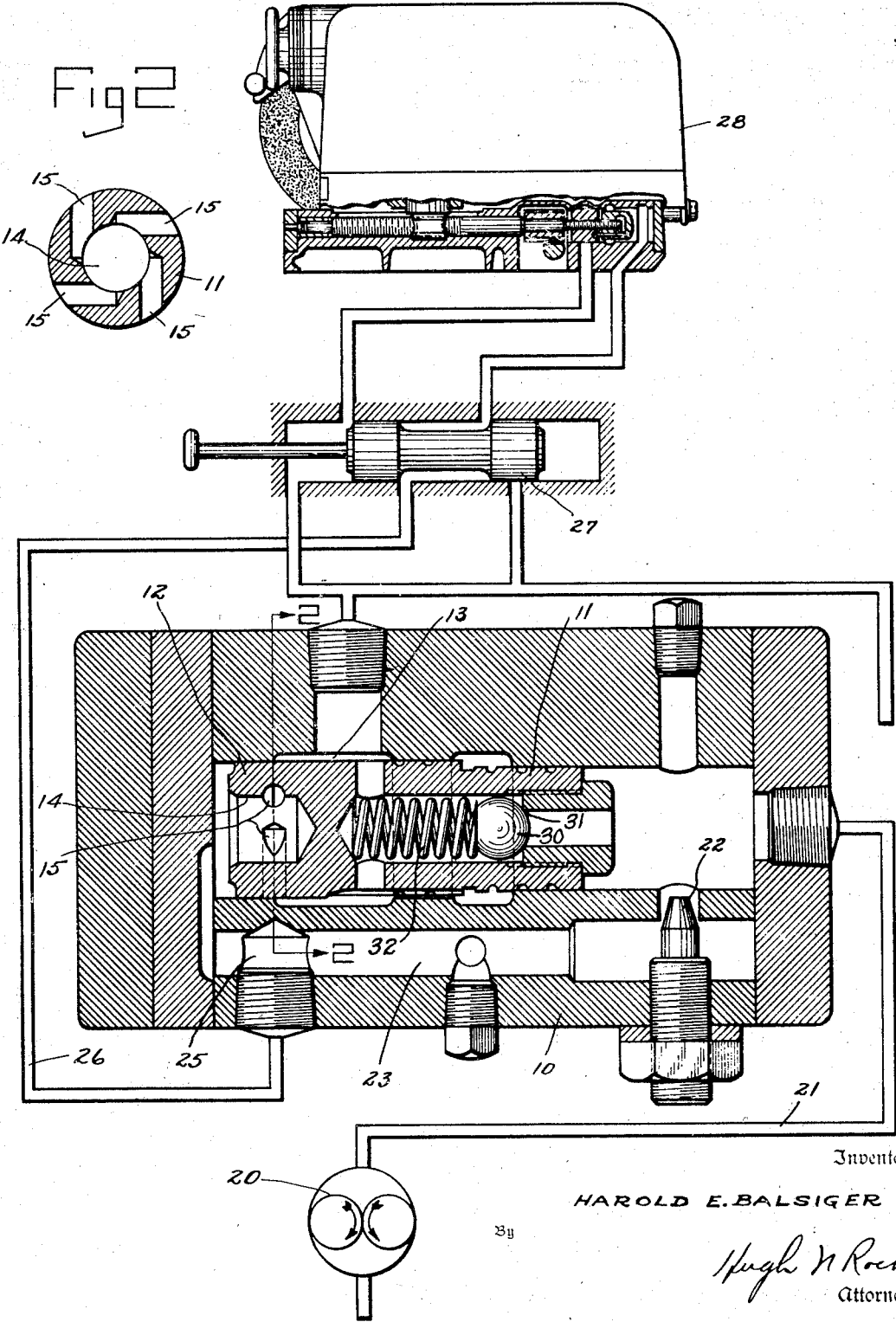
Inventor
HAROLD E. BALSIGER
By Hugh N Roche
Attorney Patented Sept. 26, 1944

2,359,017

UNITED STATES PATENT OFFICE 2,359,017

RELIEF VALVE

Harold E. Balsiger, Waynesboro, Pa., assignor to Landis Tool Company, Waynesboro, Pa.

Application March 4, 1942, Serial No. 433,369

2 Claims. (Cl. 137—53)

This invention relates to relief valves for hydraulic systems, particularly of the type which compensate for change in viscosity such as that shown and described in co-pending application Serial No. 390,432, filed April 25, 1941.

The function of a relief valve is to prevent an excess of pressure in a hydraulic system. Usually an excess of fluid under pressure is supplied which results in the relief valve being forced open to permit the escape of such excess. During the operation of the hydraulic system the requirements for fluid vary and the amount of fluid which escapes thru the relief valve also varies correspondingly. However, due to friction, inertia, etc., the movement of the valve usually lags somewhat behind the change in pressure and is not as sensitive as might be desired.

In order to increase the sensitivity of this relief valve, means have been provided for causing said valve to rotate about its own axis during the time that the system is under pressure. This causes said valve to float on the fluid and thus respond to smaller changes in pressure.

Figure 1 is an enlarged sectional elevation of a floating relief valve in the hydraulic system of a grinding machine.

Figure 2 is a cross section on the line 2—2 of Figure 1.

In the drawing, numeral 10 indicates a valve housing in which is slidably mounted a valve member 11, one end of which is larger than the other. The large end 12 controls the size of opening of an exhaust port 13. A short axial bore 14 in the large end of said valve is connected thru a series of tangential passages 15 with the circumference thereof. Fluid under pressure passing thru said tangential passages causes said valve to rotate.

A ball valve 30 held against its seat 31 inside valve 11 by spring 32 serves to release excess fluid in case said valve 11 fails to function properly.

Fluid under pressure from a pump 20 flows thru line 21 to the small end of valve 11 then thru throttle valve 22 and passage 23 in said housing to the large end of said valve. Between said throttle valve and the large end of said valve there is in said passage a port 25 to passage 26 leading to a reversing valve 27 for a driven mechanism, in this case a grinding wheel support 28.

As soon as the system is placed under pressure, fluid acts to shift valve 11 from left to right. This movement continues only long enough to permit sufficient fluid to escape thru tangential passages 15 to balance the valve against the pump pressure at the other end thereof. The flow of fluid thru passages 15 causes said valve to rotate on its own axis. This movement provides a continuous film of fluid between the surface of the valve and the housing so that the valve is in effect floating. The valve member is subjected to a reciprocating movement due to variation in pressure so that the passages 15 move back and forth across the edge of exhaust port 13 to vary the amount of fluid escaping therethru. Because valve 11 is floating on a film of fluid there is a considerable reduction in friction and therefore said valve reacts to much smaller variations in pressure than its predecessors. Furthermore, when said valve is rotating and floating, its position in the bore is substantially concentric thereto and clearance is small enough that leakage past the valve is reduced to a minimum.

I claim:

1. In a hydraulic system, a pressure operated relief valve including a housing, a valve member movable therein in response to variation in fluid pressure in said housing, said housing having fluid connections in communication with the opposite ends of the valve member for moving said valve member in each of two opposite directions, an exhaust port in said housing in communication with said valve member, an end portion of said valve member having a recess therein, passages from said recess to the outer surface of said valve member at the edge of said exhaust port, said passages and said valve member being constructed and arranged to cause fluid under pressure passing thru said passages to rotate said valve member about its axis and float in said housing.

2. In a hydraulic system, a pressure operated relief valve including a housing, a valve member movable therein in response to variation in fluid pressure in said housing, said housing having fluid connections in communication with the opposite ends of the valve member for moving said valve member in each of two opposite directions, an exhaust port in said housing in communication with said valve member, an inlet port in said housing spaced longitudinally from said exhaust port, said valve member having a hollow portion in communication with said inlet port, passages from said hollow portion to the outer surface of said valve member at the edge of said exhaust port, said passages and said valve member being constructed and arranged to cause fluid under pressure passing thru said passages to rotate said valve member about its axis and float in said housing.

HAROLD E. BALSIGER.